(12) United States Patent
Gaudillat

(10) Patent No.: US 8,227,142 B2
(45) Date of Patent: Jul. 24, 2012

(54) PLATE FOR FUEL CELL INCLUDING FEED AND DISCHARGE CHANNELS HAVING THREE AXES OF SYMMETRY

(75) Inventor: Pierre Gaudillat, Paris (FR)

(73) Assignee: Renault S.A.S., Boulogne-Billancourt (FR)

( * ) Notice: Subject to any disclaimer, the term of this patent is extended or adjusted under 35 U.S.C. 154(b) by 432 days.

(21) Appl. No.: 12/352,085

(22) Filed: Jan. 12, 2009

(65) Prior Publication Data

US 2009/0162731 A1   Jun. 25, 2009

Related U.S. Application Data

(63) Continuation of application No. 12/066,898, filed as application No. PCT/FR2006/050749 on Jul. 26, 2006, now abandoned.

(30) Foreign Application Priority Data

Sep. 16, 2005   (FR) .................................... 05 09497

(51) Int. Cl.
*H01M 8/04* (2006.01)
(52) U.S. Cl. ........................ 429/514; 429/457
(58) Field of Classification Search .................. 429/514, 429/457
See application file for complete search history.

(56) References Cited

U.S. PATENT DOCUMENTS

| 4,988,583 | A | 1/1991 | Watkins et al. |
|---|---|---|---|
| 5,641,586 | A | 6/1997 | Wilson |
| 6,333,019 | B1 | 12/2001 | Coppens |
| 6,616,327 | B1 | 9/2003 | Kearney et al. |
| 2004/0023100 | A1 | 2/2004 | Boff et al. |
| 2004/0067405 | A1* | 4/2004 | Turpin et al. ............... 429/38 |
| 2007/0105000 | A1* | 5/2007 | Chapman et al. ............ 429/38 |

FOREIGN PATENT DOCUMENTS

WO   WO 2004114446 A1  * 12/2004

* cited by examiner

*Primary Examiner* — Barbara Gilliam
*Assistant Examiner* — Zachary Best
(74) *Attorney, Agent, or Firm* — Oblon, Spivak, McClelland, Maier & Neustadt, L.L.P.

(57) ABSTRACT

The invention concerns a plate for fuel cell, in particular of the ion-exchange membrane type, comprising supply channels (2 to 5) connected to an intake orifice (2a) arranged in the center of one of the surfaces of the plate, and discharge channels (6 to 9) wherein circulate respectively a reactive fluid stream with relatively high concentration and a reactive fluid stream with relatively low concentration. The supply and/or discharge channels are symmetrically arranged on the plate, the supply and discharge channels having similar fractal configurations arranged complementarily to obtain a network of interweaving channels.

8 Claims, 4 Drawing Sheets

PLATE FOR FUEL CELL INCLUDING FEED AND DISCHARGE CHANNELS HAVING THREE AXES OF SYMMETRY

CROSS-REFERENCE TO RELATED APPLICATIONS

The present application is a continuation of U.S. application Ser. No. 12/066,898 filed on Mar. 14, 2008, which is the National Stage of PCT/FR06/50749 filed on Jul. 26, 2006, and in turn claims priority to FR 05 09497 filed on Sep. 16, 2005.

BACKGROUND

The present invention relates to a plate for a fuel cell, in particular for a fuel cell of the type comprising an ion-exchange membrane (PEM), intended to be fitted to a motor vehicle.

Fuel cells of the PEM type generally comprise a stack of bipolar plates and of ion-exchange membranes, the membranes being formed by a solid electrolyte produced, for example, from polymers.

The bipolar plates are provided, on their faces in contact with the membranes, with grooves forming, with said membranes, distribution channels or conduits which allow the gases to move in contact with the membrane.

Anodic gases move on one side of the membrane and cathodic gases move on the opposite side. Oxidation/reduction reactions of the anodic and cathodic gases occur on both sides of the membrane, with exchanges of ions through it, the electrons being conveyed by the bipolar plates. Electrical energy is thus recovered and used, in particular for the traction of the motor vehicle.

When the gases move in the channels from an inlet to an outlet, the reactants are gradually consumed. The concentration of reactants in the stream moving in the channels is thus reduced as the stream moves along. This reduction in reactants, a fortiori close to the distribution channel outlets, can result in a nonuniform distribution of the reactants over the active exchange surface of the membrane. This does not allow satisfactory operation of the cell to be achieved.

Thus, with the aim of obtaining a better performance and an increased reliability of the fuel cell, it is desirable to provide a homogeneous distribution of the anodic and cathodic reactants over the active regions of the membranes.

Various solutions have already been devised in order to obtain a better distribution of the reactants. Thus it is that U.S. Pat. No. 4,988,583 describes a bipolar plate provided, on one of its faces, with a single channel for the distribution of fluids which makes its way from one edge of the plate to an opposite edge and which is produced from a plurality of continuous meanders spread out in boustrophedon form. The meanders are arranged on the face of the plate so as to be distributed over most of said face.

U.S. Pat. No. 5,641,586 for its part describes a bipolar plate comprising a plurality of inlet channels and outlet channels for fluids arranged between one another in intersected fashion, the fluids moving from the inlet channels to the outlet channels while passing through a gas diffusion layer.

In addition, the documents U.S. Pat. No. 6,616,327 and U.S. Pat. No. 6,333,019 describe an arrangement of feed and/or discharge conduits for fluids, in particular for a fuel cell comprising a stack of plates, in which inlet and outlet sections are inserted onto each of the plates so as to obtain fluid circulation conduits exhibiting a staged fractal configuration.

In addition, the documents US-A-2004/0023100 and US 2004/0067405 describe a bipolar plate comprising feed and/or discharge conduits for fluids provided with a main branch and with successive side branches, with a reduced cross section with respect to said main conduit, and arranged so as to obtain conduits exhibiting a fractal configuration.

The channels or conduits for feeding and/or discharging fluids described in these documents do not provide an arrangement which makes it possible to significantly improve a distribution of reactants in order to obtain a homogeneous distribution of the reactants on the membrane.

BRIEF SUMMARY

The aim of the present invention is thus to overcome this disadvantage by providing a plate for a fuel cell which makes it possible to homogeneously distribute fluids so as to increase the operational reliability of said cell.

According to one aspect of the invention, a plate for a fuel cell, in particular of the type comprising an ion-exchange membrane, comprises feed channels connected to an intake orifice positioned at the center of one of the faces of the plate and discharge channels in which a stream of reactive fluid at a relatively high concentration and a stream of reactive fluid at a relatively low concentration respectively move.

The feed and/or discharge channels are inserted onto the plate in symmetrical fashion, the feed and discharge channels exhibiting similar fractal configurations which are arranged in complementary fashion in order to obtain a network of intertwined channels.

With such an arrangement, it consequently becomes possible to obtain a more homogeneous distribution of the reactants on the bipolar plate.

This is because the anticipation of feed channels exhibiting a fractal geometry of symmetrical structure in combination with the arrangement of an intake orifice at the center of a face of the plate makes possible distribution of the fluid over the whole of the plate according to courses and flow rates which are identical in the various regions of the plate.

In addition, the arrangement on the same plate of feed and discharge channels exhibiting similar fractal configurations which are arranged in complementary fashion in order to obtain a network of intertwined channels makes it possible to obtain not only an identical flow rate for the feeding and the discharging of the plate but also discharge channels which are surrounded by feed channels, while being close to these, which makes it possible to obtain an arrangement of movement channels in which the fluid poorer in reactant is situated in the vicinity of movement channels in which the fluid is rich in reactant.

Advantageously, the feed and discharge channels comprise at least two axes of symmetry.

Preferably, the feed and discharge channels comprise main conduits, each main conduit being provided with a plurality of successive side branches arranged in symmetrical fashion with respect to said conduit.

The symmetrical structure of the side branches makes it possible to provide an identical flow rate for each respective main conduit.

In one embodiment, the lengths and the cross sections of the successive side branches are each time equal, from a branching point, for each respective feed conduit.

Thus, the velocity and the pressure drops are each time equal in the various regions of the plate, whatever the flow which is moving, and a homogeneous distribution and/or discharge of the reactants is/are obtained, guaranteeing optimum operation of the cell.

The main conduits of the feed channels are connected to the intake orifice and can advantageously be four in number and extend between said orifice and the corners of the plate.

Advantageously, the main conduits of the discharge conduits emerge on each of the sides of the plate.

In a preferred embodiment, the ratios of the cross sections between immediately consecutive portions of the main conduit are identical to one another.

BRIEF DESCRIPTION OF THE DRAWINGS

The present invention will be better understood on studying the detailed description of embodiments taken by way of examples without any implied limitation and illustrated by the appended drawings, in which.

DETAILED DESCRIPTION

With reference to FIGS. 1 to 4, a description will now be given of various embodiments of channels for the movement of reactive fluid for a fuel cell plate.

A fuel cell plate comprises a certain number of grooves which delimit between them, in conjunction with an ion-exchange membrane, several channels in which a reactive fluid moves.

Figure 1:
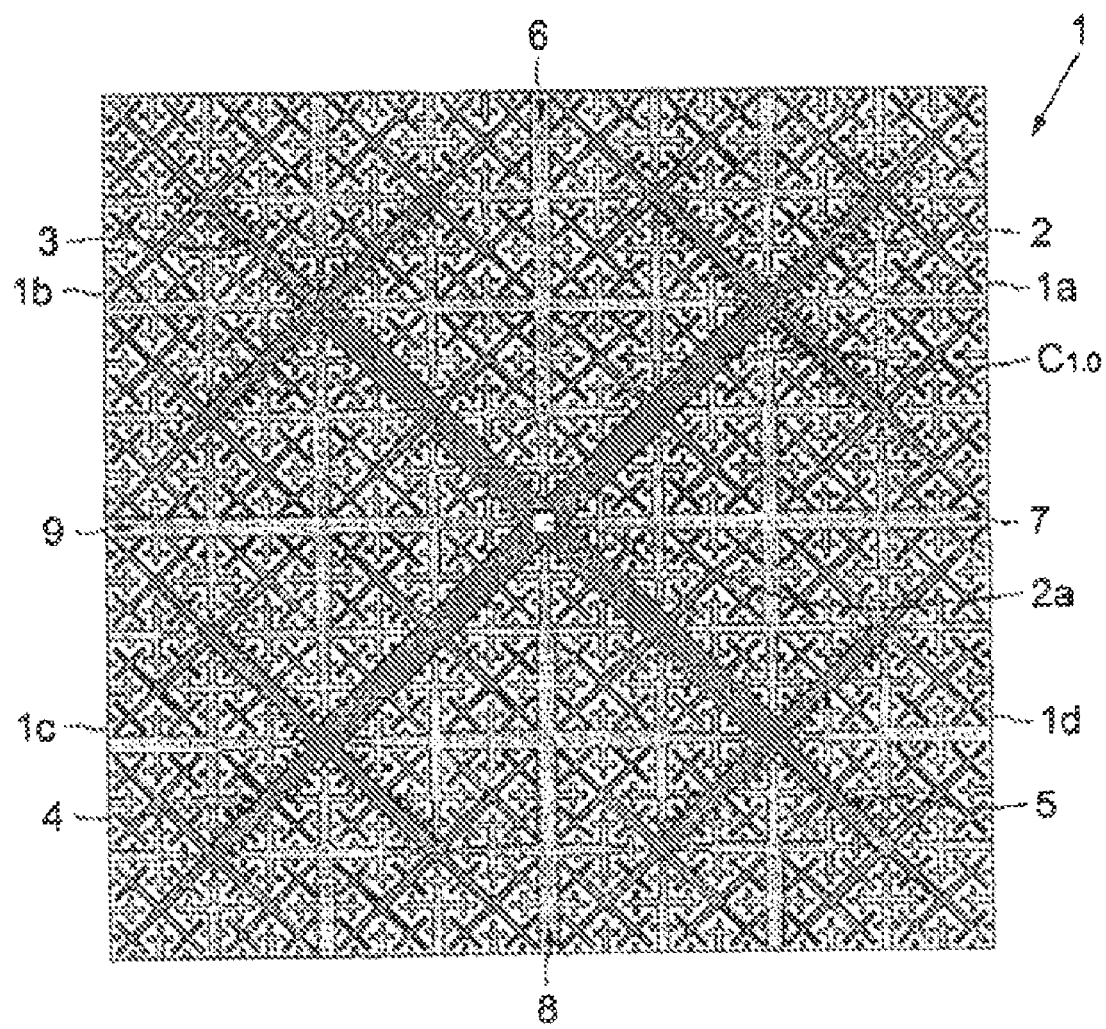
FIGS. 1 and 2 illustrate an example of the arrangement of channels for the movement of reactive fluid of a plate for a fuel cell.

In FIG. 1, a plate referenced 1 in its entirety exhibits a square general shape. The plate can be a bipolar plate or also a monopolar plate. Several movement and discharge channels are inserted in the form of grooves extending over a face of said plate.

The plate 1 can be divided into four identical square regions delimited by two straight lines perpendicular to the sides. The straight lines and the diagonals of the plate form axes of symmetry within the meaning of plane geometry.

Figure 2:
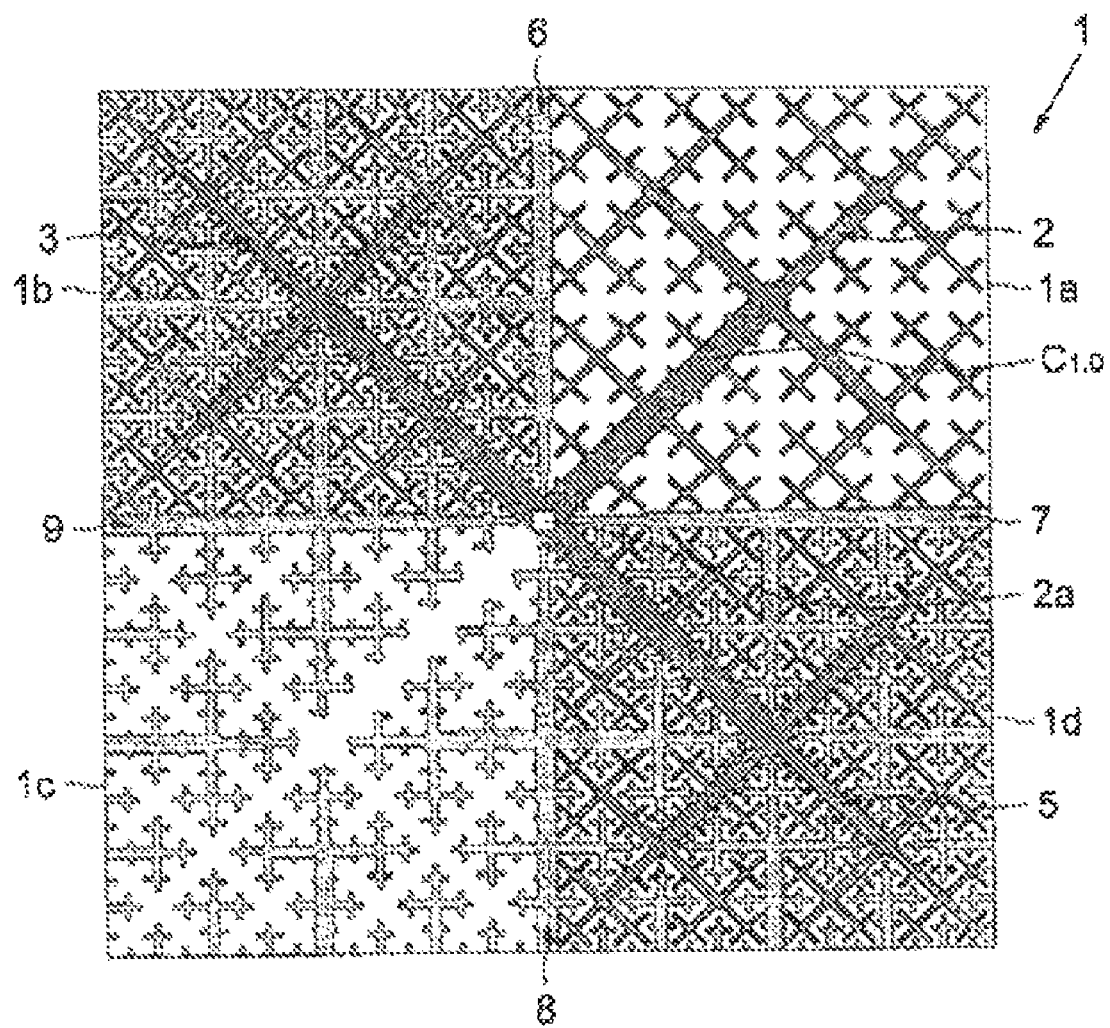

A first feed channel 2 is formed on the plate in a square region 1$a$ situated at the top right of FIGS. 1 and 2. The first feed channel 2 comprises a main conduit $C_1$ extending rectilinearly from an intake orifice 2$a$ inserted at the center of the face of the plate 1 as far as the vicinity of the upper right tip of the plate 1. Said main conduit $C_1$ comprises a plurality of portions $C_{1.0}$ to $C_{5.0}$ extending thus along the semi-diagonal of the plate 1. The portion $C_{1.0}$ is connected to the intake orifice 2$a$, the portion $C_{5.0}$ extending as far as the vicinity of the upper right tip. The portions $C_{1.0}$ to $C_{5.0}$ exhibit here a constant depth and a width which gradually decreases from portion to portion.

Figure 3:
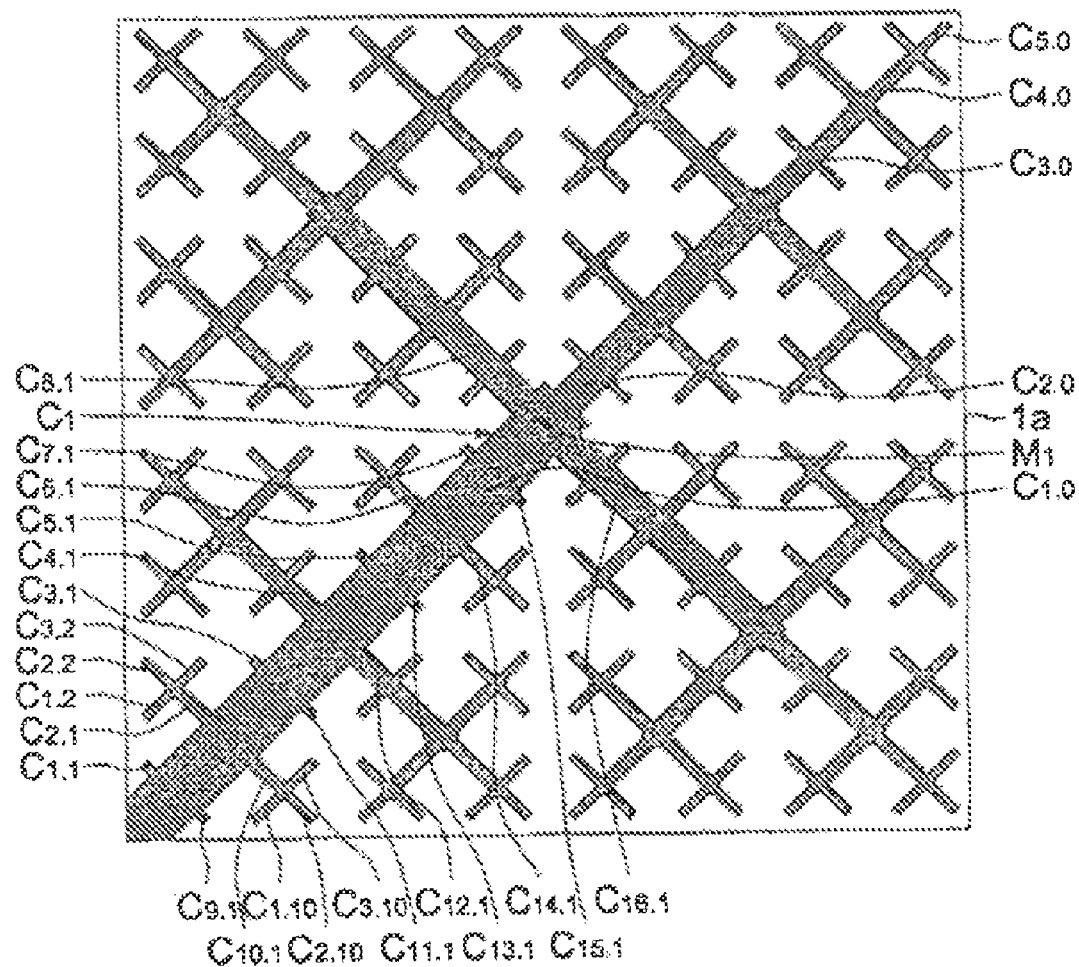
FIG. 3 is a detailed view of FIG. 2.

As illustrated more obviously in FIG. 3, which represents a detailed view of the feed channel 2 in the region 1$a$, the first portion $C_{1.0}$ of the main conduit $C_1$ of the feed channel 2 comprises a plurality of successive rectilinear side branches. The portion $C_{1.0}$ of the main conduit $C_1$ divides here into sixteen side branches, referenced $C_{1.1}$ to $C_{16.1}$ which extend perpendicularly with respect to said main conduit while being arranged so as to retain a uniform spacing between two immediately adjacent side branches.

The side branches $C_{1.1}$ to $C_{8.1}$ are situated on the left-hand side of the square region 1$a$, on considering the portion $C_{1.0}$, the side branches $C_{9.1}$ to $C_{16.1}$ being symmetrical respectively to the branches $C_{1.1}$ to $C_{8.1}$, with respect to said portion $C_{1.0}$.

The branches $C_{1.1}$ and $C_{9.1}$ are symmetrical with respect to the branches $C_{3.1}$ and $C_{11.1}$, on considering the branches $C_{2.1}$ and $C_{10.1}$. The side branches $C_{2.1}$ and $C_{10.1}$ exhibit lengths and cross sections substantially greater than those of the branches $C_{1.1}$ and $C_{9.1}$.

Each of the side branches $C_{2.1}$ and $C_{10.1}$ again subdivides into three successive derived side branches, respectively referenced $C_{1.2}$, $C_{2.2}$, $C_{3.2}$, $C_{1.10}$, $C_{2.10}$ and $C_{3.10}$. The derived branches $C_{1.2}$, $C_{3.2}$, $C_{1.10}$ and $C_{3.10}$ are perpendicular to the branches $C_{2.1}$ and $C_{10.1}$. The branches $C_{2.2}$ and $C_{2.10}$ are respectively directed in the same direction as the branches $C_{2.1}$ and $C_{10.1}$. The derived branches of a side branch are symmetrical with respect to the derived branches of the other side branch, on considering the portion $C_{1.0}$. The successive side branches $C_{1.2}$, $C_{2.2}$, $C_{3.2}$, $C_{1.0}$, $C_{2.10}$ and $C_{3.10}$ exhibit identical lengths and cross sections to those of the side branches $C_{1.1}$ and $C_{9.1}$.

The distance between two immediately adjacent side branches of the portion $C_{1.0}$ is substantially equal to the distance between the branching point of the main conduit $C_{1.0}$ and of the side branch $C_{2.1}$ and the branching point of the main conduit $C_{2.1}$ with the successive derived side branches $C_{1.2}$, $C_{2.2}$ and $C_{3.2}$.

The side branches $C_{5.1}$ and $C_{13.1}$, $C_{6.1}$ and $C_{14.1}$, and $C_{7.1}$ and $C_{15.1}$ are symmetrical respectively with respect to the side branches $C_{3.1}$ and $C_{11.1}$, $C_{2.1}$ and $C_{10.1}$, and $C_{1.1}$ and $C_{9.1}$, on considering the branches $C_{4.1}$ and $C_{12.1}$. Analogously to the branches $C_{2.1}$ and $C_{10.1}$, the side branches $C_{6.1}$ and $C_{14.1}$ thus separate into three successive derived branches.

The branches $C_{4.1}$ and $C_{12.1}$ each divide, at their ends, again into three successive side branches positioned at 45° with respect to one another and with dimensions identical to those of the branch $C_{2.1}$. Each of said successive side branches again separates into three branches with dimensions identical to those of the branch $C_{1.2}$. The branch $C_{4.1}$ also comprises two additional successive side branches obtained by rotation of the branches $C_{3.1}$ and $C_{11.1}$, on considering the branching point of the portion $C_{1.0}$ and of the branch $C_{4.1}$. The successive side branches of the branch $C_{12.1}$ are symmetrical to those of the branch $C_{4.1}$, with respect to the portion $C_{1.0}$.

The portion $C_{1.0}$ of the conduit $C_1$, the side branches $C_{1.1}$ to $C_{7.1}$ and $C_{9.1}$ to $C_{15.1}$, and their successive side branches, thus form a first subnetwork of feed conduits in the region 1$a$.

The side branch $C_{8.1}$ extends from the main conduit $C_{1.0}$ as far as the vicinity of the upper left tip of the square region 1$a$. The side branches $C_{8.1}$ and $C_{16.1}$ comprise a plurality of successive branches symmetrical between one another with respect to said respective side branch and with respect to the conduit $C_{1.0}$.

The successive side branches of the side branch $C_{8.1}$ are obtained by rotating by 90° in the clockwise direction, on considering a branching point $M_1$ of the main conduit $C_{1.0}$ and of the side branch $C_{8.1}$ branches $C_{5.1}$, $C_{13.1}$, $C_{7.1}$, $C_{15.1}$ and also $C_{6.1}$ and $C_{14.1}$ and their associated successive side branches. Thus, the side branches of the branch $C_{16.1}$ are obtained by rotating by 90° in the trigonometric sense, on considering the branching point $M_1$ and the abovementioned branches.

The branches $C_{8.1}$ and $C_{16.1}$ each again divide, at their ends, into three side branches positioned at 45° with respect to one another, each of said branches exhibiting a geometric structure and dimensions identical to those of the branch $C_{4.1}$ and comprising associated successive side branches arranged in analogous fashion. Thus, the branches $C_{8.1}$ and $C_{16.1}$ and their derived successive side branches form second and third subnetworks of feed conduits which are identical to one another.

The portions $C_{2.0}$ to $C_{5.0}$ of the main conduit $C_1$ are connected to a plurality of side branches and of derived side branches so as to form a fourth subnetwork of feed conduits which can be obtained, from the second subnetwork, by rotation by 90° in the clockwise direction.

In order to ensure that the distribution of the fluid is completely homogeneous, provision is made, in addition, for the cross section of a portion $C_{n.0}$ of the main conduit $C_1$, in which n can have the value 2, 3, 4 or 5, to be one third that of the portion $C_{n-1.0}$. It is thus seen that the pressure drops in the flow of the fluid from the branching point $M_1$ are exactly the same for each of the second, third and fourth subnetworks.

To this end and as mentioned above, the precaution has preferably been taken for the distance between two immediately adjacent side branches of the main conduit $C_1$ to be substantially equal to the distance between two immediately adjacent successive side branches of the respective side branch.

On again considering FIGS. 1 and 2, the plate 1 also comprises second, third and fourth feed channels, referenced 3 to 5, respectively formed in square regions 1b to 1d of said plate and each extending from the intake orifice 2a as far as the vicinity of the facing tip of the corresponding square region. Said regions 1b to 1d are respectively situated at the top left, at the bottom left and at the bottom right. Each of said feed channels also comprises a main conduit and a plurality of successive side branches (not referenced).

The second, third and fourth feed channels 3 to 5 are obtained respectively from the first channel 2 by rotation by 90°, 180° and 270° in the trigonometric sense having as center the intake orifice 2a.

The feed channels 2 to 5 are thus symmetrical in pairs with respect to the straight lines perpendicular to the sides of the plate 1 delimiting the regions 1a to 1d. The flow of the fluid through the channels thus takes place in a perfectly homogeneous and identical manner in these various regions.

The network of feed conduits thus formed by the channels 2 to 5 thus exhibits an internal similarity geometry property, any part of said network exhibiting an appearance substantially identical to its overall appearance. The network thus exhibits a fractal configuration. Of course, the property of invariance by change in scale is limited by the technical feasibility of the drillings in order to obtain side branches with a small diameter.

The plate 1 also comprises main discharge channels, here four in number and referenced 6 to 9, extending respectively from the middle of the upper edge, from the middle of the left side edge, from the middle of the lower edge and from the middle of the right side edge in the direction of the intake orifice 2a with a width which gradually decreases. The discharge channels 6 to 9 exhibit a geometric structure similar to that of the feed channels 3 to 5 but exhibit dimensions reduced in a ratio of $\sqrt{2}/2$. The discharge channels 6 to 9 exhibit a similar fractal configuration, only the lengths and the cross sections varying.

The discharge channels 7 to 9 can be obtained, from the first channel 6, respectively by rotation by 90°, 180° and 270° in the trigonometric sense having as center the intake orifice 2a. The successive branches of a discharge channel extend into two successive square regions of the plate 1. The discharge channels 6 to 9 are symmetrical in pairs with respect to the diagonals of the plate 1.

The plate 1 also comprises side discharge channels in each of the square regions 1a to 1d which exhibit geometric patterns identical to those of the discharge channels 6 to 9. In the square region 1a, the plate 1 comprises a first combination of discharge channels (not referenced) extending from the upper edge of said region. These side channels can be obtained from the side branches of the discharge conduit 7 situated in the square region 1a by rotation by 90° in the trigonometric sense having as center the branching point $M_1$.

In the region 1a, the plate 1 also comprises a second combination of side discharge channels extending from the right-hand edge of this region. These channels are obtained from the discharge channels of the first combination by rotation by 90° in the clockwise direction, on considering the branching point $M_1$.

Analogously, the square regions 1b to 1d also comprise first and second combinations of side discharge channels. In the region 1c, the side discharge channels are obtained by symmetry of the side channels of the region 1a, on considering the diagonal of the plate passing through the lower right tip and through the upper left tip. In the regions 1b and 1d, the side discharge channels are obtained respectively from the channels of the regions 1a and 1c by symmetry, on considering the vertical straight line perpendicular to the upper and lower edges which delimits the regions 1b and 1c from the regions 1a and 1d.

In this way, the arrangement of main discharge channels 6 to 9 and of the side discharge channels with respect to that of the feed channels 2 to 5 in combination with the similar fractal geometric configuration of these channels thus makes it possible to obtain a homogeneous distribution and discharge of the fluid over the whole of the plate 1 with identical pressure drops. The average route of a reactive gas component between its entry onto the plate and its departure is thus substantially equal, particularly in terms of length and of pressure drops, whatever its course, in order to provide a homogeneous distribution over the surface.

In addition, the arrangement of the discharge channels in which the fluid relatively poorer in reactant makes its way, after passing through a gas diffusion layer of the cell, close to the feed channels in which the fluid is relatively rich in reactant, is also particularly advantageous for optimum operation of the cell.

Figure 4:
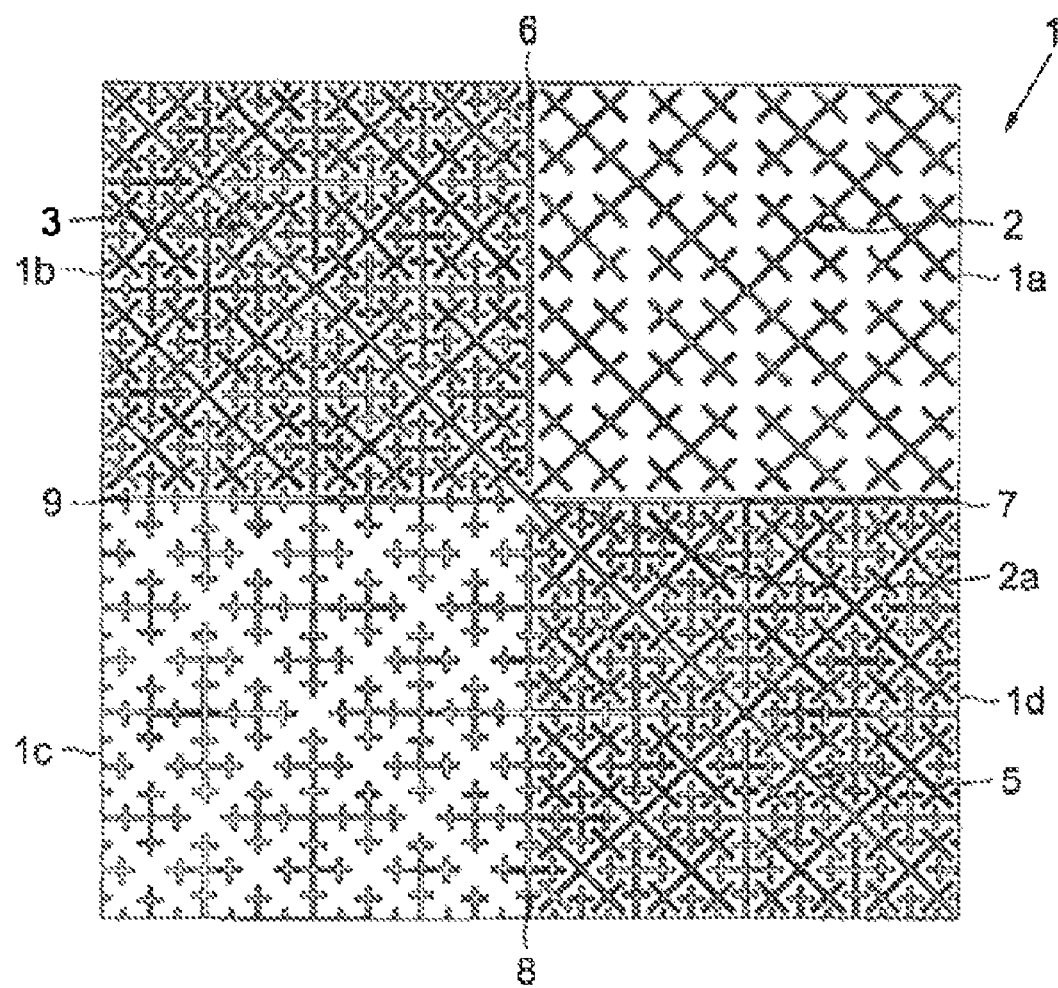
FIG. 4 illustrates a second example of the arrangement of channels for the movement of reactive fluid of a plate for a fuel cell.

The embodiment illustrated in FIG. 4 differs in that the feed channels 2 to 5, the main discharge channels 6 to 9 and the side discharge channels exhibit a uniform width and variable depths, while, however, retaining ratios of cross sections identical to those described in the preceding embodiment, so as to obtain a homogeneous distribution and discharge over the plate.

What is claimed is:

1. A fuel cell plate, comprising:
   an intake orifice positioned at a center of a face of the plate;
   a first feed channel extending from the intake orifice towards an upper left corner of the plate, the first feed channel including a main line that branches into three secondary lines;
   a second feed channel extending from the intake orifice towards an upper right corner of the plate, the second feed channel including a main line that branches into three secondary lines;
   a third feed channel extending from the intake orifice towards a lower left corner of the plate, the third feed channel including a main line that branches into three secondary lines;
   a fourth feed channel extending from the intake orifice towards a lower right corner of the plate, the fourth feed channel including a main line that branches into three secondary lines; and
   discharge channels formed on the face of the plate,
   wherein the plate includes a first axis of symmetry extending from a top edge of the plate to a bottom edge of the plate such that the first feed channel is symmetrical across the first axis of symmetry to the second feed channel and the third feed channel is symmetrical across the first axis of symmetry to the fourth feed channel, wherein the plate includes a second axis of symmetry extending from a left edge of the plate to a right edge of the plate such that the first feed channel is symmetrical across the second axis of symmetry to the third feed channel and the second feed channel is symmetrical across the second axis of symmetry to the fourth feed channel, and wherein the plate includes a third axis of symmetry extending from the upper left corner of the plate to the lower right corner of the plate such that the second feed channel is symmetrical across the third axis of symmetry to the third feed channel, a portion of the first feed channel on a first side of the third axis of symmetry is symmetrical across the third axis of symmetry to a portion of the first feed channel on a second side of the third axis of symmetry, and a portion of the fourth feed channel on a first side of the third axis of symmetry is symmetrical across the third axis of symmetry to a portion of the fourth feed channel on a second side of the third axis of symmetry.

2. The plate as claimed in claim 1, wherein the discharge channels each comprise a main conduit, the main conduit being provided with a plurality of successive side branches arranged symmetrically with respect to said conduit.

3. The plate as claimed in claim 2, wherein the main conduits of the discharge channels emerge on each of the edges of the plate.

4. The plate as claimed in claim 1, wherein a total cross section of the three secondary lines of the first feed channel is equal to a cross section of the first feed channel.

5. The plate as claimed in claim 1, wherein
all of the discharge channels positioned on a first side of the first axis of symmetry are symmetrical to all of the discharge channels positioned on a second side of the first axis of symmetry,
all of the discharge channels positioned on a first side of the second axis of symmetry are symmetrical to all of the discharge channels positioned on a second side of the second axis of symmetry, and
all of the discharge channels positioned on a first side of the third axis of symmetry are symmetrical to all of the discharge channels positioned on a second side of the third axis of symmetry.

6. A fuel cell, comprising:
an ion-exchange membrane; and
a fuel cell plate in contact with the membrane, the plate comprising
an intake orifice positioned at a center of a face of the plate,
a first feed channel extending from the intake orifice towards an upper left corner of the plate, the first feed channel including a main line that branches into three secondary lines,
a second feed channel extending from the intake orifice towards an upper right corner of the plate, the second feed channel including a main line that branches into three secondary lines,
a third feed channel extending from the intake orifice towards a lower left corner of the plate, the third feed channel including a main line that branches into three secondary lines,
a fourth feed channel extending from the intake orifice towards a lower right corner of the plate, the fourth feed channel including a main line that branches into three secondary lines, and
discharge channels formed on the face of the plate, wherein the plate includes a first axis of symmetry extending from a top edge of the plate to a bottom edge of the plate such that the first feed channel is symmetrical across the first axis of symmetry to the second feed channel and the third feed channel is symmetrical across the first axis of symmetry the fourth feed channel, wherein the plate includes a second axis of symmetry extending from a left edge of the plate to a right edge of the plate such that the first feed channel is symmetrical across the second axis of symmetry to the third feed channel and the second feed channel is symmetrical across the second axis of symmetry to the fourth feed channel, and wherein the plate includes a third axis of symmetry extending from the upper left corner of the plate to the lower right corner of the plate such that the second feed channel is symmetrical across the third axis of symmetry to the third feed channel, a portion of the first feed channel on a first side of the third axis of symmetry is symmetrical across the third axis of symmetry to a portion of the first feed channel on a second side of the third axis of symmetry, and a portion of the fourth feed channel on a first side of the third axis of symmetry is symmetrical across the third axis of symmetry to a portion of the fourth feed channel on a second side of the third axis of symmetry.

7. The fuel cell as claimed in claim 6, wherein a total cross section of the three secondary lines of the first feed channel is equal to a cross section of the first feed channel.

8. The fuel cell as claimed in claim 6, wherein
all of the discharge channels positioned on a first side of the first axis of symmetry are symmetrical to all of the discharge channels positioned on a second side of the first axis of symmetry,
all of the discharge channels positioned on a first side of the second axis of symmetry are symmetrical to all of the discharge channels positioned on a second side of the second axis of symmetry, and
all of the discharge channels positioned on a first side of the third axis of symmetry are symmetrical to all of the discharge channels positioned on a second side of the third axis of symmetry.

* * * * *